United States Patent [19]
Wiemann et al.

[11] Patent Number: 6,093,497
[45] Date of Patent: Jul. 25, 2000

[54] PROCESS FOR THE PRODUCTION OF MULTILAYERED COATINGS

[75] Inventors: Gudrun Wiemann, Telgte; Lutz Gross, Haltern; Götz-Ekkehard Sapper, Ostbevern-Brock; Joachim Woltering, Münster, all of Germany

[73] Assignee: BASF Coatings AG, Muenster-Hiltrup, Germany

[21] Appl. No.: 09/091,634

[22] PCT Filed: Dec. 18, 1996

[86] PCT No.: PCT/EP96/05693

§ 371 Date: Aug. 21, 1998

§ 102(e) Date: Aug. 21, 1998

[87] PCT Pub. No.: WO97/23307

PCT Pub. Date: Jul. 3, 1997

[30] Foreign Application Priority Data

Dec. 21, 1995 [DE] Germany .......................... 195 47 943

[51] Int. Cl.⁷ .......................... B32B 27/20; B32B 27/30; B05D 1/36; B05D 3/02; B05D 7/16
[52] U.S. Cl. ....................... 428/500; 427/140; 427/407.1; 427/409; 427/410; 428/423.1; 428/424.2; 428/483; 428/515; 428/523
[58] Field of Search .................................. 427/409, 407.1, 427/410, 386, 388.4, 140, 142; 428/500, 523, 423.1, 424.2, 483, 515, 518

[56] References Cited

U.S. PATENT DOCUMENTS 5,157,069 10/1992 Campbell .

*Primary Examiner*—Diana Dudash

[57] ABSTRACT

A description is given of a process for preparing a multilayer coating on a substrate surface, in which (A) an aqueous coating composition (ii) containing as film-forming agent an aqueous polymer dispersion is applied as basecoat (II) to a substrate surface coated with an aqueous basecoat (i), (B) the composition applied in step (A) is subjected to partial drying, (C) an appropriate transparent topcoat composition is applied to the basecoat (II) thus obtained, and (D) the basecoats (I) and (II) are baked together with the topcoat, wherein the basecoat composition (II) contains an aqueous polymer dispersion comprising (x) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and (y) a thickener, which does not have an associative effect, containing an acrylate copolymer based on ($C_1$–$C_6$)-alkyl (meth)acrylate and (meth)acrylic acid.

16 Claims, No Drawings

PROCESS FOR THE PRODUCTION OF MULTILAYERED COATINGS

The present invention relates to a process for producing multilayer coatings on a substrate surface, in which
(A) an aqueous basecoat composition (ii) containing as film-forming agent an aqueous polymer dispersion is applied to a substrate surface coated with an aqueous basecoat composition (i),
(B) an appropriate transparent topcoat composition is applied to the composition obtained in step (A), and
(C) the basecoat compositions (i) and (ii) are baked together with the topcoat composition,
and to coated substrates which can be prepared by this process.

The prior art has disclosed processes of coating motor vehicle bodies, especially car bodies, where the substrate is generally coated first of all with an electrodeposition coating material and/or anti-stonechip intermediate primer, a primer surfacer layer or a first basecoat, which may be pigmented, and then a basecoat layer is applied using a coating material comprising at least one pigment, and this basecoat layer is coated over, if desired, with a transparent coating material. The resulting single- or multilayer coating system is subsequently baked. Substrates are coated with two basecoats in particular when high-hiding films are to be obtained at low film thicknesses of about 20 to 30 µm.

The object of the present invention is to provide a process for producing multilayer coatings, and a process for repairing multilayer coatings on a substrate surface, in which the use of a specific aqueous basecoat composition at low film thicknesses gives rise to high-hiding coatings, and where it is desirable that said basecoat composition be suitable both for solid-color finishes and for metallic or mica effect finishes. The basecoat composition used should, furthermore, be compatible with customary clearcoats, such as aqueous or solventborne clearcoats or transparent powder coatings, and these clear coating materials should be able to be applied to the basecoat without there being, in comparison to conventional coating systems, any deterioration in the appearance of the coating system.

The present invention therefore provides a process for producing a multilayer coating on a substrate surface, in which
(A) an aqueous basecoat composition (ii) containing as film-forming agent an aqueous polymer dispersion is applied to a substrate surface coated with an aqueous basecoat composition (i),
(B) an appropriate transparent topcoat composition is applied to the composition obtained in step (A), and
(C) the basecoat compositions (i) and (ii) are baked together with the topcoat composition.
wherein the basecoat composition (ii) contains an aqueous polymer dispersion comprising
(x) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and
(y) a thickener, which does not have an associative effect, containing an acrylate copolymer based on ($C_1$–$C_6$)-alkyl (meth)acrylate and (meth)acrylic acid.

The present invention also provides a process for repairing multilayer coatings, in which
(D) a basecoat layer (II) is repaired with an aqueous coating composition (ii) containing as film-forming agent an aqueous polymer dispersion,
(E) the coating obtained in step (D) is coated with an appropriate transparent topcoat composition, and
(F) the coating composition (ii) is cured together with the topcoat.
wherein the basecoat composition (ii) contains an aqueous polymer dispersion comprising
(x) an acrylate polymer based on from 30 to 60% by weight of $C_1$–$C_8$- alkyl (meth)acrylate monomers, from 30 to 60% by weight of vinyl-aromatic monomers and from 0.5 to 10% by weight of (meth)acrylic acid, and
(y) a thickener, which does not have an associative effect, containing an acrylate copolymer based on ($C_1$–$C_6$)-alkyl (meth)acrylate and (meth)acrylic acid.

Surprisingly it has been found that the novel process for producing multilayer coatings is highly suited to the production of multilayer coatings on substrates and for repairing multilayer coatings, especially for car bodies. The basecoat can be covered with any desired transparent coating materials, for example aqueous or solventborne coating materials or else powder coatings. Coatings which include the basecoat used in accordance with the invention can be repaired without problems in cases of damage.

The aqueous polymer dispersion employed in accordance with the invention in the basecoat composition (ii) comprises (x) an acrylate polymer and (y) a thickener containing an acrylate copolymer.

The acrylate polymer of component (x) employed in accordance with the invention can as $C_1$–$C_8$-alkyl (meth) acrylate monomer units comprise the linear and branched-chain derivatives, with preference being given to methyl (meth)acrylate, ethyl (meth)acrylate, n-propyl and isopropyl (meth)acrylate, n-butyl and isobutyl (meth)acrylate and 2-ethylhexyl (meth)acrylate. Further monomers which may be present are (meth)acrylamide monomers and derivatives thereof.

Examples of vinyl-aromatic monomers which can be employed are styrene, α-alkylstyrene and vinyltoluene.

The acrylate polymer can be prepared by methods known from the prior art, for example emulsion polymerization. The acrylate polymer is preferably employed in the form of a dispersion. During the preparation process, the proportion between the monomers and the water can be established preferably such that the resulting dispersion has a solids content of from 30 to 60% by weight, preferably from 35 to 60% by weight, and can be employed directly for preparing the basecoat composition. A particularly suitable acrylate polymer is obtainable commercially as an aqueous dispersion under the designation Acronal 290 D (BASF AG; Ludwigshafen).

For the preparation of a dispersion of the acrylate polymer, an anionic emulsifier, alone or mixed with others, is preferably employed as emulsifier.

Examples of anionic emulsifiers are the alkali metal salts of sulfuric acid half-esters of alkylphenols or alcohols, the alkali metal salts of sulfuric acid half-esters of ethoxylated alkylphenols or ethoxylated alcohols, preferably the alkali metal salts of the sulfuric acid half-ester of a nonylphenol reacted with from 4 to 5 mol of ethylene oxide per mole, or of an alkyl- or arylsulfonate, sodium lauryl sulfate, sodium lauryl ethoxylate sulfate, and secondary sodium alkanesulfonates whose carbon chain contains 8–20 carbon atoms. The amount of the anionic emulsifier is from 0.1 to 5.0% by weight, based on the monomers, preferably from 0.5 to 3.0% by weight. Furthermore, to increase the stability of the aqueous dispersions it is also possible to employ a nonionic emulsifier of the type of an ethoxylated alkylphenol or fatty alcohol, for example an addition product of 1 mol of nonylphenol and from 4 to 30 mol of ethylene oxide, in a mixture with the anionic emulsifier.

The glass transition temperature of the acrylate polymer is preferably between 15° C. and 35° C., particularly preferably between 20° C. and 25° C.

The acrylate polymer employed in accordance with the invention preferably has a number-average molar mass (determined by gel permeation chromatography with polystyrene as standard) of from 200,000 to 2,000,000, preferably from 300,000 to 1,500,000.

As thickener component (rheological auxiliary) (y) in the basecoat composition use is made in accordance with the invention of acrylate copolymers having non-associative groups and comprising as monomer units $(C_1-C_6)$-alkyl (meth)acrylate and (meth)acrylic acid. A preferred copolymer comprises as its monomer units (meth)acrylic acid and at least two different $(C_1-C_6)$-alkyl (meth)acrylate monomers. In the copolymer, the (meth)acrylic acid is present preferably in amounts of from 40% by weight to 60% by weight, with particular preference from 46% by weight to 55% by weight, based on the amount of the overall copolymer. The $(C_1-C_6)$-alkyl (meth)acrylate monomer I is preferably present in amounts of from 30% by weight to 50% by weight, in particular from 36% by weight to 46% by weight, and the (meth)-acrylate polymer II preferably in amounts of from 1% by weight to 10% by weight, in particular from 2% by weight to 8% by weight, based in each case on the amount of the overall copolymer. The rheological auxiliary is intended to give the basecoat composition the desired viscosity, especially at the generally alkaline pH that is employed. A particular preferred thickener is—if in dispersion form—mobile and thickens at a neutral or basic pH. The acrylate copolymer is suitably employed as a finished dispersion. Dispersions of this kind include, as emulsifiers, preferably fatty alcohol alkoxylates, especially $C_8-C_{22}$ fatty alcohol ethoxylates. A particularly suitable acrylate copolymer dispersion is obtainable commercially under the designation Viscalex HV 30 (Allied Corporation, Great Britain).

In the basecoat composition used in accordance with the invention the thickener is present preferably in an amount of from 0.5 to 5.0% by weight, in particular from about 0.3 to 1.5% by weight, based on the solids content. Normally, the thickener is employed as a dispersion having a concentration of from 15 to 45% by weight, preferably from 20 to 35% by weight.

An auxiliary binders the novel coating composition may also include epoxy-functional and/or carboxyl-functional constituents, such as customary glycidyl compounds, for example glycidyl acrylate polymers or glycidyl methacrylate polymers. Examples of suitable carboxyl-functional crosslinking agent are carboxylic acids, especially saturated, straight-chain, aliphatic dicarboxylic acids with 3 to 20 carbon atoms in the molecule, preference being given to the use of dodecane-1,12-dioic acid. For modifying the properties, the crosslinking agents may also include epoxide groups and carboxyl functions in a single compound.

Polyvinyl alcohol may also be employed as a further auxiliary binder. It has been found that the addition of polyvinyl alcohol in am amount of up to 10% by weight, preferably from 1 to 5% by weight, is able to improve the compatibility with the topcoat compositions which are applied over the basecoat composition. Polyvinyl alcohol has a solvent-repelling action, so that solvent or other components possibly present in the topcoat composition are unable, owing to the repellant action of the polyvinyl alcohol, to penetrate into the basecoat composition and alter the color.

Other crosslinking agents which can be employed are those known in the coating sector, such as melamine resins, which are able to react with free OH groups.

In addition to the polymer described above, the basecoat compositions may also include further compatible water-dilutable resins such as, for example, amino resins, polyesters, polyurethanes and also acrylated polyurethanes and urethanized acrylates, which serve to achieve certain coating properties such as adhesion and generally as grinding resins for pigments.

The auxiliary binder and/or the crosslinking agent can be employed in an amount of up to 10% by weight, in particular from 0.5 to 10% by weight.

The basecoat compositions (ii) employed in accordance with the invention generally have a solids content of from about 15 to 60% by weight. The solids content varies with the intended use of the coating compositions. For metallic finishes, for example, it is preferably from 17 to 25% by weight. For solid-color finishes it is higher, for example at from 30 to 45% by weight.

To neutralize components (x) and (y) it is possible to employ ammonia and/or amines (especially alkylamines), amino alcohols and cyclic amines, such as di- and triethylamine, aminomethylpropanol, dimethylaminoethanolamine, diisopropanolamine, morpholine and N-alkylmorpholine. Highly volatile amines are preferred for neutralization. The aqueous coating composition is normally adjusted to a pH of between 6 and 9, preferably from 7 to 8.5.

The basecoat composition (ii) can include organic solvents in an amount of up to 15% by weight. Examples of suitable organic solvents are naphthalenes, petroleum spirits and alcohols. As further liquid components the novel basecoats may comprise alkylene glycols, such as ethylene glycol, propylene glycol, butylene glycol, 1,4-butanediol, 1,6-hexanediol, neopentylglycol and other diols, such as dimethylolcyclohexane.

As pigments, the basecoat composition (ii) may include customary pigments employed for coating car bodies, such as, for example, special-effect pigments, and also organic and inorganic color-imparting pigments.

Examples of suitable special-effect pigments are commercial aluminum bronzes, the aluminum bronzes chromated in accordance with DE-A 36 36 183, commercial stainless-steel bronzes, and also other customary metal platelet and metal flake pigments, and nonmetallic special-effect pigments, such as, for example, pearle-scent and interference pigments.

Examples of suitable inorganic color-imparting pigments are titanium dioxide, iron oxides and carbon black. Examples of organic color-imparting pigments are Indanthren blue, Chromophthal red, Irgazine orange, Sicotrans yellow, Heliogen green, and the like.

It is also possible for anticorrosion pigments, such as zinc phosphate, to be present.

In addition, the basecoat composition (ii) can also contain fillers customary in the field of paint chemistry. These include silicic acid, magnesium silicate, tal, titanium dioxide and barium sulfate.

The proportion of pigments and fillers in the novel coating composition may amount in total to from 5 to 25% by weight, based on the solids content. The pigment can be added in any desired form, for example as an aqueous slurry or as a paste. The pigments may be dispersed, for example, with a grinding resin (auxiliary binder, dispersion auxiliary and water). In the case of solid-color coating materials it is preferably to slurry the pigments in dispersion auxiliary and water. Where aluminum and/or flakes are employed they are, if desired, slurried in a mixture of water and surfactant and, if appropriate, solvent, or dispersed in the principal binder or in another, auxiliary binder. The pigment pastes should as far as possible be prepared without solvents.

The amount of component (x) may vary depending on the pigment employed. If the pigments are organic and/or inorganic color-imparting pigments, then component A is preferably present in an amount of from 25 to 50% by weight, based on the solids content. If the pigments are special-effect pigments, component A is preferably present in an amount of from 15 to 30% by weight, based on the solids content.

As further component the basecoat composition may include film-forming auxiliaries. Suitable film-forming auxiliaries are dialkyl dicarboxylates, 1,2-propylene glycol, high-boiling petroleum spirits, and naphthalenes, having a boiling point of more than 100° C., preferably more than 140° C.

The basecoat composition may, if desired, also include other auxiliaries and additives. Examples of these are catalysts, auxiliaries, antifoams, dispersion auxiliaries, wetting agents, preferably carboxy-functional dispersants, antioxidants, UV absorbers, free-radical scavengers, leveling agents, biocides and/or water-retention agents.

The basecoat composition (ii) is applied to a substrate surface coated with an aqueous basecoat composition (i). The aqueous basecoat composition (i) used is preferably a coating formulation comprising a) as binder a water-dilutable polyurethane resin which has an acid number of from 10 to 60 and a number-average molecular weight of from 4000 to 25,000 and can be prepared by reacting aa) a polyester- and/or polyetherpolyol having a number-average molecular weight of from 400 to 5000, or a mixture of such polyester- and/or polyetherpolyols, bb) a polyisocyanate or a mixture of polyisocyanates, cc) a compound having at least one group which is reactive toward isocyanate groups and at least one group which is capable of forming anions in the molecule, or a mixture of such compounds, and, if desired, dd) a hydroxyl and/or amino-containing organic compound having a molecular weight of from 40 to 400, or a mixture of such compounds, with one another, and at least partially neutralizing the resulting reaction product, and also comprises b) pigments and/or fillers, the ratio of binder to pigment being between 0.5:1 and 1.5:1.

For this formulation it is particularly advantageous if a coating formulation is prepared based on a physically drying polyurethane dispersion without polyesters and amino resins. It has been found that the use of a coating material consisting only of polyurethane resins and pigments leads to a material which can be used with particular success as a primer surfacer and anti-stonechip intermediate primer layer, since it is unexpectedly stable toward mechanical stresses, especially stonechipping and impacts.

Components (a) can be prepared from aa), bb), cc) and, if used, dd) by methods of polyurethane chemistry which are well known to the skilled worker (cf. e.g. U.S. Pat. No. 4,719,132, DE-A 3,628,124 EP-A-89,497, EP-A-256,540 and WO 87/03829). As component (aa) it is possible to employ saturated and unsaturated polyester- and/or polyetherpolyols, especially polyester- and/or polyetherdiols having a number-average molecular weight of from 400 to 5000. Examples of suitable polyetherdiols are polyetherdiols of the general formula H(—O—(CHR$^1$)$_n$—)$_m$OH, where R$^1$ is hydrogen or a lower, substituted or unsubstituted alkyl radical, n is 2 to 6, preferably 3 to 4, and m is 2 to 100, preferably 5 to 50. Examples are linear or branched polyetherdiols, such as poly(oxyethylene) glycols, poly (oxypropylene) glycols and poly(oxybutylene) glycols. The polyetherdiols selected should not introduce excessive amounts of ether groups, since otherwise the polymers formed swell in water. The preferred polyetherdiols are poly(oxypropylene) glycols in the molar mass range $M_n$ from 400 to 3000.

Polyesterdiols are prepared by esterifying organic dicarboxylic acids or their anydrides with organic diols, or are derived from a hydroxycarboxylic acid or from a lactone. The prepare branched polyesterpolyols, it is possible to a minor extent to employ polyols or polycarboxylic acids of higher functionality. The dicarboxylic acids and diols can be linear or branched, aliphatic, cycloaliphatic or aromatic dicarboxylic acids or diols.

The diols used to prepare the polyesters consist, for example, of alkylene glycols, such as ethylene glycol, propylene glycol, butylene glycol, 1,4-butane-diol, 1,6-hexanediol, neopentylglycol and other diols, such as dimethylolcyclohexane. It is however also possible to add small amounts of polyols, such as trimethylolpropane, glycerol, pentaerythritol. The acid component of the polyester consists primarily of low molecular mass dicarboxylic acids or their anhydrides having 2 to 30, preferably 4 to 18, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, where they exist. In connection with the formation of polyesterpolyols it is also possible for relatively small amounts of carboxylic acids having three or more carboxyl groups to be present, examples being trimellitic anhydride or the adduct of maleic anhydride with unsaturated fatty acids.

Further possibilities for use are polyesterdiols obtained by reacting a lactone with a diol. Such compounds are characterized by the presence of terminal hydroxyl groups and repeating polyester units of the formula (—CO—(CHR$^2$)$_n$—CH$_2$—O). In this formula n is preferably 4 to 6 and the substituent R$^2$ is hydrogen or an alkyl, cycloalkyl or alkoxy radical.

The substituents may have up to 18 carbon atoms. Examples thereof are hydroxycaproic acid, hydroxybutyric acid, hydroxydecanoic acid and/or hydroxystearic acid.

To prepare the polyesterdiols, preference is given to the unsubstituted ε-caprolactone, where n has the value 4 and all R substituents are hydrogen. The reaction with lactone is initiated by low molecular mass polyols, such as ethylglycol, 1,3-propanediol, 1,4-butanediol, dimethylolcyclohexane. It is however also possible to react other reaction components, such as ethylenediamine, alkyldialkanolamines or else urea, with caprolactone.

Other suitable diols of relatively high molecular mass are polylactamdiols, which are prepared by reacting ε-caprolactam, for example, with low molecular mass diols.

As component bb) it is possible to employ aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate.

Owing to their good resistance to ultraviolet light, (cyclo) aliphatic polyisocyanates give rise to products having a low tendency toward yellowing. Examples thereof are isophorone diisocyanate, cyclopentylene diisocyanate, and hydrogenation products of the aromatic diisocyanates, such as cyclohexylene diisocyanate, methylcyclohexylene diisocyanate and dicyclohexylmethane diisocyanate. Aliphatic diisocyanates are compounds of the formula OCN—$(CR^3{}_2)_r$—NCO, where r is an integer from 2 to 20, in particular from 6 to 8, and $R^3$, which can be identical or different each time, is hydrogen or a lower alkyl radical of 1 to 8 carbon atoms, preferably 1 to 2 carbon atoms. Examples thereof are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Particularly preferred diisocyanates are isophorone diisocyanate and dicyclohexylmethane diisocyanate.

In terms of the functionality of the polyisocyanates, component bb) must be composed such that no crosslinked polyurethane resin is obtained. In addition, to diisocyanates component bb) may also include a proportion of polyisocyanates with functionalities of more than two, such as triisocyanates, for example. Products which have proven suitable as triisocyanates are those formed by trimerization or oligomerization of diisocyanates or by reaction of diisocyanates with polyfunctional compounds containing OH or NH groups. These include, for example, the biuret or hexamethylene diisocyanate and water, the isocyanurate of hexamethylene diisocyanate or the adduct of isophorone diisocyanate with trimethylol-propane. The mean functionality can be lowered, if desired, by adding monoisocyanates. Examples of such chain-terminating monoisocyanates are phenyl isocyanate, cyclohexyl isocyanate and stearyl isocyanate.

In order to ensure the water-dilutability of the polyurethane resins employed, it is necessary to build groups capable of forming anions into the polyurethane molecules. Following their neutralization the groups capable of forming anions ensure that the polyurethane resin can be dispersed stably in water. The polyurethane resin a) should have an acid number of 10 to 60, preferably from 20 to 35. From the acid number it is possible to calculate the amount of groups capable of forming anions that is to be introduced into the polyurethane molecules.

The introduction of groups capable of forming anions into the polyurethane molecules is accomplished by the incorporation of compounds cc) into the polyurethane molecules, containing at least one group which is reactive toward isocyanate groups and one group capable of forming anions in the molecule.

As component cc) use is preferably made of compounds containing, the molecule, two groups which are reactive toward isocyanate groups. Particularly suitable groups which are reactive toward isocyanate groups are hydroxyl groups and also primary and/or secondary amino groups. Suitable groups capable of forming anions are carboxyl, sulfonic acid and/or phosphonic acid groups, carboxyl groups being preferred. For example, alkanoic acids with two substituents on α carbon atoms can be employed as component cc). The substituent may be a hydroxyl group, an alkyl group or preferably, an alkylol group. These alkanoic acids have at least one, generally from 1 to 3, carboxyl groups in the molecule. They have from 2 to about 25, preferably from 3 to 10, carbon atoms. Examples of component cc) are dihydroxypropionic acid, dihydroxysuccinic acid and dihydroxybenzoic acid. A particularly preferred group of alkanoic acids comprises the α,α- dimethylolalkanoic acids of the general formula $R^4$—$C(CH_2OH)_2COOH$, where $R^4$ is a hydrogen atom or an alkyl group having up to about 20 carbon atoms.

Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of amino-containing compounds are α,δ-diaminovaleric acid, 3,4-diaminobenzoic acid, 2,4-diaminotoluenesulfonic acid and 2,4-diaminodiphenyl ether sulfonic acid.

The preferably employed polyurethane resins a) can be prepared with or without the use of hydroxyl- and/or amino-containing organic compounds having a molecular weight of from 40 to 400, or a mixture of such compounds (component dd)). The use of component dd) leads to an increase in the molecular weight of the polyurethane resins. Examples of components dd) which can be employed are polyols having up to 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentylglycol, neopentylglycol hydroxypivalate, hydroxyethylated or hydroxypropylated bisphenol A, hydrogenated bisphenol A, and mixtures thereof.

The polyols are generally employed in amounts of up to 30% by weight, preferably from 2 to 20% by weight, based on the amount of component aa) and dd) employed. As component dd) it is also possible to employ di- and/or polyamines with primary and/or secondary amino groups. Polyamines are essentially alkylene-polyamines having 1 to 40 carbon atoms, preferably from about 2 to 15 carbon atoms. They may carry substituents which have no hydrogen atoms reactive with isocyanate groups. Examples are polyamines with a linear or branched aliphatic, cycloaliphatic or aromatic structure and at least two primary amino groups. Diamines which can be mentioned are hydrazine, ethylenediamine, propylenediamine, 1,4-butylenediamine, piperazine, 1,4-cyclohexyldimethylamine, 1,6-hexamethylenediamine, trimethylhexamethylenediamine, methylenediamine, isophoronediamine, 4,4'-diaminodicyclohexylmethane and aminoethylethanolamine. Preferred diamines are hydrazine, alkyl- or cycloalkyldiamines, such as propylenediamine and 1-amino-3-aminomethyl-2,5,5-trimethylcyclohexane. It is also possible to employ polyamines as component dd) which contain more than two amino groups in the molecule. In such cases, however, care must be taken, for example by using monoamines as well, that no crosslinked polyurethane resins are obtained. Polyamines of this kind which can be used are diethylenetriamine, triethylenetetraamine, dipropylenetriamine and dibutylenetriamine. An example of a monoamine is ethylhexylamine.

The preparation of component a) is prior art and is described in detail, for example, in U.S. Pat. No. 4,719,132, DE-A 3,628,124, EP-A-89,497, EP-A-256,540 and WO 87/03829.

To neutralize component a) it is possible to employ ammonia and/or amines (especially alkylamines), amino alcohols and cyclic amines, such as di- and tri-ethylamine, dimethylaminoethanolamine, diisopropanolamine, morpholine, N-alkylmorpholine. The volatile amines are preferred for the neutralization.

It is particularly important to take care with the weight ratio of binder to pigment and/or filler. This ratio is preferably between 0.5:1 and 1.5:1. Preference is given to the range between 0.6:1 and 1.2:1.

A substance which has become established as a pigment and/or filler is talc. Its proportion among the overall amount of pigments and fillers is from 20 to 80% by weight. Preference is given to the range from 30 to 70% by weight.

It is possible if desired to add, in small amounts, amino resins. These should not make up more than 10% by weight of the overall amount of basecoat composition. It is preferred to remain below 5% by weight. Resins of this kind are well known to the skilled worker and are offered by many companies as commercial products. Amino resins are condensation products of aldehydes, especially formaldehyde, with, for example, urea, melamine, guanamine and benzoguanamine. The amino resins contain alcohol groups, preferably methylol groups, some or—preferably—all of which are generally etherified with alcohols. Preference is given to the use of water-dilutable amino resins, especially water-dilutable melamine-formaldehyde resins.

Polyisocyanate crosslinking agents may likewise be present in the coating formulation. Their proportions are as a general rule below 30% by weight, preferably below 10% by weight. The crosslinking agent is generally reactive at less than 130 degrees Celsius.

The use of the coating composition (i) which can be employed with preference and is as described above permits considerably lower film thicknesses than comparable materials in accordance with the prior art. These thicknesses are well below 35 μm, i.e. regularly below 15 μm. Despite this low film thickness, a degree of stonechip resistance is achieved which corresponds to film thicknesses of 35 μm or more.

Over the basecoat composition (i) it is possible, after predrying if desired at about 70° C., to apply the basecoat composition (ii) and, subsequently, a transparent topcoat. The coating thus obtained is subsequently baked in a manner known per se, preferably at a temperature between 130 and 160° C. If the color of basecoat composition (i) is matched to the color of the basecoat composition (ii) it is even possible to reduce the film thicknesses still further without any reduction in quality.

In addition to the substances mentioned the basecoat composition (i) described can include all additives and auxiliaries which are known per se in paint technology, as have been mentioned for the basecoat composition (ii).

Following the application of the basecoat composition (i) the basecoat composition (ii) is applied in a manner known per se, for example by spraying, brushing, dipping, flowcoating, knifecoating or rolling, to the substrate, for example metal, plastic, wood or glass.

Prior to application to the coating (i), the basecoat composition (ii) can if desired be admixed further with water to adjust the solids content, solvents or rheological auxiliaries to adjust the application properties, and also, if desired, a base for pH regulation. If the viscosity is still not within the desired range, then further rheological auxiliary (y) or further thickener, in an amount of from 0.01 to 0.06% by weight if desired, based on the solids content, can be added.

The basecoat compositions applied to the substrate in step (A) are overcoated in step (B) of the novel process with a suitable transparent topcoat composition. Before applying the transparent topcoat, it is advantageous to leave the coating to evaporate for a short time, preferably from 1 to 15 minutes, in particular from 4 to 8 minutes, at a temperature of from 60 to 100° C., preferably from 70 to 85° C. The evaporation period depends on the temperature and can be adjusted over wide ranges.

Particularly resistant multilayer coatings can be obtained if the substrate obtained in step (A) is partially dried. Partial drying is preferably carried out to an extent such that the degree of film formation or crosslinking of the basecoat (ii) is such that water and/or solvents which may be present in the topcoat composition applied in step (B) are unable to diffuse into the basecoat (ii).

All customary topcoats can be applied as the transparent topcoat composition. Preference is given to the clear coating materials used in the sector of paint chemistry, such as, for example, waterborne or solventborne clearcoats, transparent powder coatings, transparent powder slurry coating materials, solvent-containing and aqueous two-component clearcoats, etc., particular preference being given to transparent powder slurry coating materials.

The transparent topcoat composition can be applied by customary techniques which are known in the prior art.

The present invention additionally provides, accordingly, a multilayer-coated substrate, where the coating is applied to the substrate surface such that (A) an aqueous coating composition (ii) containing as film-forming agent an aqueous polymer dispersion is applied to a substrate surface coated with an aqueous basecoat composition (i), (B) an appropriate transparent topcoat composition is applied to the composition obtained in step (A), and (C) the basecoat compositions (i) and (ii) are baked together with the topcoat composition, wherein the basecoat composition (ii) contains an aqueous polymer dispersion comprising (x) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and (y) a thickener, which does not have an associative effect, containing an acrylate copolymer based on ($C_1$–$C_6$)-alkyl (meth)acrylate and (meth)acrylic acid.

In the course of repairing multilayer coatings it is possible to apply the basecoat composition to the substrate surface to be repaired, without special means of assistance. The coating composition can be cured at ambient temperature. When carrying out the curing at ambient temperature the above-mentioned baking time is extended correspondingly; including the two-component clearcoat used, it is approximately between 15 and 24 hours. A particular means of assistance or a special device for curing this coating composition is therefore unnecessary.

EXAMPLES

1. Preparation of the first basecoat composition 1.1 Polyurethane resin I

In a dry reaction vessel with thermometer and reflux condenser, 480.3 g of a 73% strength solution of a polyester polyol (acid number: 3.5 to 4.0, prepared from 39.5 parts by weight of Pripol® 1013 (dimeric fatty acid, manufacturer: Unichema), 21.7 parts by weight of 1,6-hexanediol and 11.7 parts by weight of isophthalic acid) in methyl ethyl ketone, 31.4 of dimethylolpropionic acid, 169.1 g of dicyclohexyl-methane diisocyanate (Desmodur® W, manufacturer: Bayer AG), 6.5 g of neopentylglycol and 52.6 g of methyl ethyl ketone are weighed out under nitrogen and heated to 85 degrees C. This temperature is maintained until an NCO content of 1.11% is reached. The mixture is cooled to 78 degrees C., and 17.8 g of trimethylolpropane and 91.3 g of methyl ethyl ketone are added. As soon as a sample of the reaction mixture, diluted with N-methylpyrrolidone in a weight ratio of 1:1, has a viscosity of between 12 and 15 dPas, 57.6 g of butyldiglycol are added to the reaction mixture and the reaction mixture is subsequently held at 78 degrees C. for 1 hour. To convert the polyurethane resin thus prepared to a water-dilutable form, 11.7 g of dimethylethanolamine and 1020 g of distilled water are added. The methyl ethyl ketone is subsequently distilled off from the resulting aqueous dispersion at from 50 to 60 degrees C. in vacuo. The pH of the dispersion is then adjusted to 7.2 using dimethylethanolamine, and the solids content of the dispersion is adjusted to 36.7% by weight using distilled water.

1.2 Preparation of the coating materials

In accordance with the parts by weight indicated in Table 1, deionized water, a commercial leveling agent based on a water-dilutable acrylate resin, a solution of a commercial antifoam based on an unsaturated branched diol in solution in butyldiglycol, and N,N-dimethylethanolamine are added to one of the above-described aqueous polyurethane dispersions, and the mixture is made up into a paste using aftertreated titanium dioxide of the rutile type and surface-treated talc and a commercial lamp black. This mixture is place in a batchwise-operating laboratory sandmill and is dispersed to a Hegmann grindometer fineness of max. 10 $\mu$m.

Aqueous coating materials are then prepared from the dispersion mixtures with the addition of further polyurethane resin dispersion and butyldiglycol, and these coating materials are adjusted with N,N-dimethylethanolamine to a pH of from 7.2 to 7.5 and with deionized water to a spray viscosity of 33 sec (DIN 4).

TABLE 1

|  | Aqueous coating material I | Aqueous coating material II | Aqueous coating material III |
| --- | --- | --- | --- |
| Polyurethane dispersion 1 | 30.00 | 30.00 | 30.00 |
| Leveling agent | 0.60 | 0.60 | 0.60 |
| Deionized water | 10.00 | 12.00 | 10.00 |
| Antifoam | 2.00 | 2.00 | 2.00 |
| N,N-dimethylethanolamine | 0.10 | 0.10 | 0.10 |
| Titanium dioxide | 5.00 | 1.00 | 5.00 |
| Talc | 10.00 | 10.00 | 10.00 |
| Blanc Fixe (Sachtleben) | 4.00 | 0.00 | 4.00 |
| Bayferrox 180 (Bayer) | 0.00 | 2.00 | 0.00 |
| Bayferrox 130 (Bayer) | 0.00 | 4.00 | 0.00 |
| Paliogenmarron L4020 (BASF) | 0.00 | 2.00 | 0.00 |
| Aerosil R972 (Degussa) | 0.20 | 0.20 | 0.20 |
| Lamp black | 0.50 | 0.20 | 0.50 |
|  | 62.40 | 64.10 | 62.40 |
| Dispersion mixture |  |  |  |
| Polyurethane resin dispersion I | 34.00 | 34.00 | 32.00 |
| Cymel 327 (Cyanamid) | 0.00 | 0.00 | 2.00 |
| Butyldiglycol | 2.00 | 1.90 | 2.00 |
| Deionized water | 1.60 | 0.00 | 1.60 |

2. Preparation of a second basecoat composition

Example 2.1

A. A reaction vessel was charged with 22 parts by weight of water, 2 parts by weight of Solvesso® 200 ($C_{10}$–$C_{13}$ aromatics mixture) and 1 part by weight of butylglycol. 30 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was added slowly to the mixture obtained in A. The pH of the resulting mixture was adjusted with dimethylethanolamine (DMEA) TO 8.0.

C. In a separate mixer, a mixture of 5 parts by weight of aluminum flakes and 5 parts by weight of butylglycol was smoothly stirred.

With vigorous stirring, the aluminum slurry obtained in C. was added in portions to the mixture obtained in B.

The viscosity of the resulting coating material was adjusted with 25 parts by weight of water to 110 mPas. The solids content was 18.85%.

Example 2.2

A. A reaction vessel was charged with 22 parts by weight of water, 2 parts by weight of Solvesso® 200 ($C_{10}$–$C_{13}$ aromatics mixture) and 1 part by weight of butylglycol. 25 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was added slowly to the mixture obtained in A. The pH of the resulting mixture was adjusted with dimethylethanolamine (DMEA) TO 8.0.

C. In a separate mixer, a mixture of 5 parts by weight of aluminum flakes and 5 parts by weight of butylglycol was smoothly stirred.

D. In a further, separate mixer, 5 parts by weight of a transparent powder coating based on a glycidyl methacrylate-containing binder and dodecanedioic acid were dispersed in 25 parts by weight of water and ground to a particle size of less than 5 $\mu$m. The mixture obtained in B was incorporated with vigorous stirring into the dispersion obtained in D.

Subsequently, the aluminum slurry obtained in C. was added in portions to the mixture obtained in B.

The viscosity of the resulting coating material was adjusted with 25 parts by weight of water to 110 mPas. The solids content was 18.35%.

Example 2.3

A coating formulation was prepared in accordance with the procedure described in Example 2, with the exception that in step D 10 parts by weight of a transparent powder coating based on a glycidyl methacrylate-containing binder and dodecanedioic acid were dispersed in 20 parts by weight of water. The solids content was 20.35%.

Example 2.4

A. A reaction vessel was charged with 22 parts by weight of water, 2 parts by weight of Solvesso® 200 ($C_{10}$–$C_{13}$ aromatics mixture) and 1 part by weight of butylglycol. 30 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was added slowly to the mixture obtained in A. The pH of the resulting mixture was adjusted with 0.4 parts by weight of dimethylethanolamine (DMEA) TO 8.0.

C. In a separate mixer, a mixture of 5 parts by weight of aluminum flakes and 5 parts by weight of butylglycol was smoothly stirred.

D. In a further, separate mixer, 10 parts by weight of a polyester obtained from 9.8% by weight of neopentylglycol, 6.2% by weight of hexahydrophthalic acid, 22.9% by weight of Pripo® 1013 (dimeric fatty acid, commercial product from Unichema), 11.1% by weight of hexanediol and 2.0% by weight of xylene as solvent, and 2.2 parts by weight of the melamine Cymel® 327 (Cyanamid) were dispersed in 12.8 parts by weight of water. The mixture obtained in B was incorporated with vigorous stirring into the dispersion obtained in D.

Subsequently, the aluminum slurry obtained in C. was added in portions to the mixture obtained in B. The solids content of the coating material was 26.83%.

Example 2.5

A. A reaction vessel was charged with 22 parts by weight of water, 2 parts by weight of Lusolvan FBH® (commercial product from BASF AG, Ludwigshafen) and 1 part by weight of butylglycol. 30 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was added slowly to the mixture obtained in A. The pH of the resulting mixture was adjusted with dimethylethanolamine (DMEA) TO 8.0.

C. 30 parts by weight of an Irgazinrot® DPP BO paste (pigment content 43.2% by weight) were added to the mixture obtained in step B and were stirred until smooth.

The viscosity of the resulting coating material was adjusted with 5 parts by weight of water to 110 mPas.

Example 2.6

A. A reaction vessel was charged with 22 parts by weight of water, 2 parts by weight of Lusolvan FBH® (commercial product from BASF AG, Ludwigshafen) and 1 part by weight of butylglycol. 25 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was added slowly to the mixture obtained in A. The pH of the resulting mixture was adjusted with dimethylethanolamine (DMEA) to 8.0.

C. In a separate mixer, 28.79 parts by weight of an Irgazinorot® DPP BO paste (pigment content 43.2% by weight), 1.17 parts by weight of Disperbyk® 190 (dispersion auxiliary) and 0.03 parts by weight of Viscalex HV 30 (solids content 30.6%) were dispersed and ground to a particle size of less than 5 μm.

D. In a further, separate mixer, 5 parts by weight parts by weight [sic] of a transparent powder coating based on a glycidyl methacrylate-containing binder and dodecanedioic acid were dispersed in 25 parts by weight of water and ground to a particle size of less than 5 μm. The mixture obtained in B was incorporated with vigorous stirring into the dispersion obtained in D.

Subsequently, the pigment paste obtained in C. was added in portions to the mixture obtained. The solid content was 28.06%.

Example 2.7

The procedure described in Example 6 was repeated except that in step A 20 parts by weight parts by weight [sic] of Acronal 290 D (aqueous dispersion, solids content 50%) and in step D 10 parts by weight parts by weight [sic] of a transparent powder coating based on a glycidyl methacrylate-containing binder and dodecanedioic acid were employed.

Example 2.8

A. A reaction vessel was charged with 22 parts by weight of water, 2 parts by weight of Lusolvan FBH® (commercial product from BASF AG, Ludwigshafen) and 1 part by weight of butylglycol. 15 parts by weight parts by weight [sic] of acronal 290 D (aqueous dispersion, solids content 50.0%) were added with stirring.

B. A mixture of 7.6 parts by weight of water and 2 parts by weight of Viscalex HV 30 (solids content 30.6%) was added slowly to the mixture obtained in A. The pH of the resulting mixture was adjusted with dimethylethanolamine (DMEA) to 8.0.

C. In a separate mixer, 28.79 parts by weight of an Irgazinrot® DPP BO paste (pigment content 43.2% by weight), 1.17 parts by weight of Disperbyk® 190 (dispersion auxiliary) and 0.03 parts by weight of Viscalex HV 30 (solids content 30.6%) were dispersed and ground to a particle size of less than 5 μm.

D. In a further, separate mixer, 10 parts by weight of a polyester obtained from 9.8% by weight of neopentylglycol, 6.2% by weight of hexahydrophthalic acid, 22.9% by weight of Pripol® 1013 (dimeric fatty acid, commercial product from Unichema), 11.1% by weight of haxanediol and 2.0% by weight of xylene as solvent, and 2.2 parts by weight of the melamine Cymel® 303 (Cyanamid) were dispersed in 12.8 parts by weight of water.

The mixture obtained in B was incorporated with vigorous stirring into the dispersion obtained in D. Subsequently, the pigment preparation prepared in step B was incorporated with stirring. The solids content was 29.04%.

3. Preparation of a transparent powder coating dispersion

3.1 Preparation of the acrylate resin 21.1 parts by weight of xylene were introduced and heated to 130° C. Into this initial charge there were metered, over the course of 4 h at 130° C. and via two separate feed vessels, the initiator: 4.5 parts by weight of TBPEH (tert.-butyl perethylhexanoate) mixed with 4.86 parts by weight of xylene, and the monomers: 10.78 parts by weight of methyl methacrylate, 26.5 parts by weight of n-butylmethacrylate, 17.39 parts by weight of styrene and 22.95 parts by weight of glycidyl methacrylate. The mixture was subsequently heated to 180° C. and the solvent was stripped off under a vacuum of <100 mbar.

3.2 Preparation of the transparent powder coating 77.5 parts by weight of acrylate resin, 18.8 parts by weight of dodecanedioic acid (acidic curing agent), 2 parts by weight of Tinuvin 1130 (UV absorber), 0.9 part by weight of Tinuvin 144 (HALS), 0.4 part by weight of Additol XL 490 (leveling agent) and 0.4 part by weight of benzoin (degassing agent) were intimately mixed in a Henschel fluid mixer, extruded on a BUSS PLK 46 extruder, ground in a Hosokawa ACM 2 mill and sieved through a 125 μm sieve.

3.4 Preparation of the dispersion 0.6 part by weight of Troykyd D777 (antifoam), 0.6 part by weight of Orotan 731 K (dispersion auxiliary), 0.06 part by weight of Surfinol TMN 6 (wetting agent) and 16.5 parts by weight of RM8 (Rohm & Haas, nonionic thickener) were dispersed in 400 parts by weight of deionized water. Then 94 parts by weight of the transparent powder coating were stirred in in small portions. Subsequently, a further 0.6 part by weight of Troykyd D777, 0.6 part by weight of Orotan 731 K and 0.06 part by weight of Surfinol TMN 6 were incorporated by dispersion. Finally, 94 parts by weight of the transparent powder coating were stirred in in small portions. The material was ground for 3.5 h in a sand mill. The average particle size ultimately measured was 4 µm. The material was filtered through a 50 µm filter and finally 0.05% of Byk 345 (leveling agent) was added.

4. Application of the coating compositions

The coating compositions listed in Table I were sprayed in an application with a dry-film thickness of 15 µm using an electrostatic high-speed rotary unit (Behr Ecobell, 45,000 rpm, discharge rate: 120 ml/min, voltage: 60 kV) onto phosphatized steel panels which had been coated with a commercial electrodeposition coating. Application took place at an air temperature of 23 degrees Celsius and a relative atmospheric humidity of 60%. The sprayed panels were predried at 23 degrees Celsius for 10 minutes and then at 70° C. for 5 minutes in a convection oven.

Overcoating was then carried out electrostatically using the coating compositions described in Examples 2.1 to 2.8 in a dry-film thickness of 14 µm, and the overcoated panels were then dried at 70° C. for 5 minutes.

The resulting basecoat was overcoated electrostatically with an aqueous transparent powder coating dispersion.

The overall coating system was then baked at 23° C. for 2 minutes, at 50° C. for 5 minutes and at 140° C. for 30 minutes.

The coating obtained showed very good leveling, gave very good coverage of the structure of the electrodeposition coating, and showed good intercoat adhesion to the electrodeposition primer.

Despite reduced layer thickness, the stonechip resistance of the coatings produced in accordance with the invention is at least as high as that of coatings prepared in accordance with DE-A-4005961.

We claim:

1. A process for preparing a multilayer coating on a substrate surface, comprising the steps of:
   (A) applying to a substrate surface coated with a first aqueous basecoat composition (i), a second aqueous basecoat composition (ii) comprising as film-forming agent an aqueous polymer dispersion, to form a coated substrate.
   (B) applying a transparent topcoat composition to the coated substrate of step (A), and
   (C) baking the basecoat compositions (i) and (ii) together with the topcoat comprising,
   wherein the basecoat composition (ii) comprises an aqueous polymer dispersion comprising:
   (x) an acrylate polymer comprising from 30 to 60% by weight of $C_1$-$C_8$ alkyl (meth)acrylate monomers, from 30 to 60% by weight of vinyl-aromatic monomers and from 0.5 to 10% by weight of (meth)acrylic acid, and
   (y) a thickener, which does not have an associative effect, comprising an acrylate copolymer which comprises ($C_1$-$C_6$)-alkyl (meth)acrylate and (meth)acrylic acid.

2. A process for repairing multilayer coatings, comprising
   (D) repairing a basecoat layer (II) with an aqueous coating composition (ii) comprising as film-forming agent an aqueous polymer dispersion, to form a repaired coating,
   (E) coating the repaired coating obtained in step (D) with a transparent topcoat composition, and
   (F) curing the coating composition (ii) together with the topcoat, wherein the basecoat composition (ii) comprises an aqueous polymer dispersion comprising
   (x) an acrylate polymer comprising from 30 to 60% by weight of $C_1$-$C_8$-alkyl (meth)acrylate monomers, from 30 to 60% by weight of vinyl-aromatic monomers and from 0.5 to 10% by weight of (meth)acrylic acid, and
   (y) a thickener, which does not have an associative effect, comprising an acrylate copolymer which comprises ($C_1$-$C_6$)-alkyl (meth)acrylate and (meth)acrylic acid.

3. The process of claim 1, wherein component (y) further comprises and acrylate dispersion having solids content of from 2.0 to 20% by weight.

4. The process of claim 1, wherein the $C_1$-$C_8$-alkyl (meth)acrylate monomers of component (x) are selected from the group consisting of methyl (meth)acrylate, ethyl (meth)acrylate, butyl (meth)acrylate, 2-ethylhexyl (meth)acrylate, and mixtures thereof.

5. The process of claim 1, wherein the vinyl-aromatic monomers of component (x) are selected from the group consisting of styrene, α-alkylstyrene, vinyltoluene, and mixtures thereof.

6. The process of claim 1, wherein the acrylate copolymer of component(y) comprises as monomer units (meth)acrylic acid and at least two different acrylate monomers, the (meth)acrylic acid present in amounts of from 40% by weight to 60% by weight, based on the total weight of the overall copolymer, and the ($C_1$-$C_6$)-alkyl (meth)acrylate monomer I present in amounts of from 30% by weight to 50% by weight, and the (meth)acrylate polymer II present in amounts of from 1% by weight to 10% by weight, based in each case on the total weight of the overall copolymer.

7. The process of claim 1, wherein said second aqueous basecoat composition (ii) further comprises compounds selected from the group consisting of epoxy-functional compounds, carboxyl-functional compounds, polyvinyl alcohol, and mixtures thereof.

8. The process of claim 1, wherein said second aqueous basecoat composition (ii) further comprises from 5 to 25% by weight of compounds selected from the group consisting of special-effect pigments, organic color-imparting pigments, inorganic color-imparting pigments and mixtures thereof.

9. The process of claim 8, wherein said second aqueous basecoat composition (ii) further comprises from 25 to 50% by weight of compounds selected from the group consisting of organic color-imparting pigments, inorganic color-imparting pigments, and mixtures thereof, based on the solids content.

10. The process of claim 8, wherein said second aqueous basecoat composition (ii) further comprises special-effect pigments in an amount of from 15 to 30% by weight, based on the solids content.

11. The process of claim 1, wherein first the aqueous basecoat composition (i) comprises
   a) a binder comprising a water-dilutable polyurethane resin having an acid number of from 10 to 60 and a number-average molecular weight of from 4000 to 25,000 and which is prepared by reacting.
      aa) a component selected from the group consisting of polyesterpolyol, polyetherpolyol, and mixtures thereof, said component having a number-average molecular weight of from 400 to 5000, bb) a polyisocyanate or a mixture of polyisocyanates, cc) a compound having at least one group which is reactive toward isocyanate groups and at least one group which is capable of forming anions in the molecule, or a mixture of such compounds, and, dd) a compound selected from the group consisting of hydroxyl compounds, amino-containing organic compounds, and mixtures thereof, said compound having a molecular weight of from 40 to 400, with one another, and at least partially neutralizing the resulting reaction product, and also comprising b) pigments and/or fillers, the ratio of binder to pigment being between 0.5:1 and 1.5:1.

12. The process of claim 1, wherein the transparent topcoat composition is selected from the group consisting of waterborne clearcoats, transparent powder coating, transparent powder coatings, transparent powder slurry coating materials, solvent-containing two-component clearcoats and aqueous two-component clearcoats.

13. A substrate coated with a multilayer coating, the coating being applied to the substrate such that (A) an aqueous coating composition (ii) comprising, as film-forming agent an aqueous polymer dispersion, is applied to a substrate surface coated with an aqueous basecoat composition (i) to create a secondary coating composition thereon, (B) a transparent topcoat composition is applied to the secondary coating composition of step (A), and (C) the basecoat and secondary coating compositions (i) and (ii) are baked together with the topcoat composition, wherein the secondary coating composition (ii) contains an aqueous polymer dispersion comprising:

(x) an acrylate polymer comprising from 30 to 60% by weight of $C_1$–$C_8$ alkyl (meth)acrylate monomers, from 30 to 60% by weight of vinyl-aromatic monomers and from 0.5 to 10% by weight of (meth)acrylic acid, and (y) a thickener, which does not have an associative effect, containing an acrylate copolymer which comprises ($C_1$–$C_6$)-alkyl (meth)acrylate and (meth) acrylic acid.

14. The process of claim 3, wherein said acrylate dispersion has a solids content of from 7.0 to 15% by weight.

15. The process of claim 7, wherein the epoxy-functional compounds are glycidyl compounds.

16. The process of claim 7 wherein the carboxyl-functional compounds are selected from the group consisting of saturated dicarboxylic acids having from 3 to 20 carbon atoms in the molecule, straight-chain dicarboxylic acids having from 3 to 20 carbon atoms in the molecule, aliphatic dicarboxylic acids having 3 to 20 carbon atoms in the molecule, and mixtures thereof.

* * * * *

UNITED STATES PATENT AND TRADEMARK OFFICE
CERTIFICATE OF CORRECTION

PATENT NO. : 6,093,497 Page 1 of 1
DATED : July 25, 2000
INVENTOR(S) : Wiemann et al.

It is certified that error appears in the above-identified patent and that said Letters Patent is hereby corrected as shown below:

Column 16,
Line 18, after "comprises", and before "acrylate", please delete "and", and insert -- an --;
Line 60, after "wherein", and before "aqueous", please delete "first the", and insert -- the first --;

Column 17,
Line 7, after "and", please insert -- optionally --;
Line 18, after "waterborne clearcoats", and before "transparent", please insert -- solvent borne clearcoats --.

Signed and Sealed this

Eighth Day of April, 2003

JAMES E. ROGAN
*Director of the United States Patent and Trademark Office*